US012654546B2

(12) United States Patent
　　Kuroi

(10) Patent No.:　US 12,654,546 B2
(45) Date of Patent:　Jun. 16, 2026

(54) VEHICLE DRIVE SHAFT INSTALLATION ASSEMBLY AND METHOD

(71) Applicant: NISSAN NORTH AMERICA, INC., Franklin, TN (US)

(72) Inventor: Masakazu Kuroi, Mexico City (MX)

(73) Assignee: NISSN NORTH AMERICA, INC., Franklin, TN (US)

( * ) Notice: Subject to any disclaimer, the term of this patent is extended or adjusted under 35 U.S.C. 154(b) by 10 days.

(21) Appl. No.: 18/959,014

(22) Filed: Nov. 25, 2024

(65) Prior Publication Data

US 2026/0145512 A1　May 28, 2026

(51) Int. Cl.
B60K 17/24　　(2006.01)

(52) U.S. Cl.
CPC ................................... B60K 17/24 (2013.01)

(58) Field of Classification Search
CPC ........... B60K 17/24; B25B 11/00; B25B 1/02; B23Q 3/061
See application file for complete search history.

(56) References Cited

U.S. PATENT DOCUMENTS

| | | | | |
|---|---|---|---|---|
| 3,758,098 A | * | 9/1973 | Vrilakas | B25B 27/0035 |
| | | | | 73/475 |
| 3,765,667 A | * | 10/1973 | Christiansen | B25H 1/0007 |
| | | | | 269/77 |
| 4,417,462 A | * | 11/1983 | Palovcik | B23P 15/00 |
| | | | | 72/340 |

| | | | | |
|---|---|---|---|---|
| 4,506,757 A | * | 3/1985 | Matsumoto | B60K 5/10 |
| | | | | 180/382 |
| 4,532,804 A | * | 8/1985 | Wilson | G01M 1/16 |
| | | | | 73/478 |
| 4,545,247 A | * | 10/1985 | Wilson | G01M 1/04 |
| | | | | 73/473 |
| 4,588,165 A | * | 5/1986 | Stellato | B66C 1/107 |
| | | | | D34/33 |
| 4,653,324 A | * | 3/1987 | Nugier | G01M 1/04 |
| | | | | 73/475 |
| 4,685,333 A | * | 8/1987 | Wilson | G01M 1/04 |
| | | | | 269/57 |
| 4,763,394 A | * | 8/1988 | Decato | B23P 19/02 |
| | | | | 29/252 |

(Continued)

FOREIGN PATENT DOCUMENTS

| | | | | |
|---|---|---|---|---|
| BR | 9803206 A | | 10/1999 | |
| BR | 102013012948 A2 | * | 6/2015 | F16J 15/004 |

(Continued)

*Primary Examiner* — Paul N Dickson
*Assistant Examiner* — Shams Dhanani
(74) *Attorney, Agent, or Firm* — Spencer Fane LLP

(57)　　　　　ABSTRACT

A vehicle drive shaft installation assembly and method includes a first fixed holder, a second fixed holder, and a movable holder. The first fixed holder is configured to support a vehicle drive shaft. The movable holder is configured to support the vehicle drive shaft. The movable holder is movable in an axial direction of the vehicle drive shaft. The second fixed holder is configured to support the vehicle drive shaft. The second fixed holder is disposed between the first fixed holder and the movable holder in the axial direction of the vehicle drive shaft. The vehicle drive shaft is configured to move axially relative to the first fixed holder and the second fixed holder.

19 Claims, 9 Drawing Sheets

(56) References Cited

U.S. PATENT DOCUMENTS

| 4,763,503 | A | * | 8/1988 | Hughes | F16H 53/025 |
| | | | | | 72/61 |
| 4,804,162 | A | * | 2/1989 | Rice | F16M 11/046 |
| | | | | | 248/129 |
| 5,054,182 | A | * | 10/1991 | Riemscheid | F01L 1/047 |
| | | | | | 29/283 |
| 5,085,099 | A | * | 2/1992 | Hughes | F16H 53/025 |
| | | | | | 123/90.6 |
| 5,228,182 | A | * | 7/1993 | Hart | B23P 19/027 |
| | | | | | 29/402.08 |
| 5,280,675 | A | * | 1/1994 | Orsini, Jr. | B21D 53/845 |
| | | | | | 29/523 |
| 5,383,652 | A | * | 1/1995 | Van Den Berg | B66C 1/107 |
| | | | | | 269/51 |
| 5,775,667 | A | * | 7/1998 | Tassic | B25H 1/0007 |
| | | | | | 248/676 |
| 5,930,908 | A | * | 8/1999 | Patrisso | G01B 5/25 |
| | | | | | 33/603 |
| 6,318,699 | B1 | * | 11/2001 | Williams | B25H 1/0007 |
| | | | | | 248/676 |
| 6,913,540 | B2 | * | 7/2005 | Iihara | F16D 3/223 |
| | | | | | 464/902 |
| 7,779,540 | B2 | * | 8/2010 | McCaffrey | B66C 11/04 |
| | | | | | 29/559 |
| 7,827,664 | B1 | * | 11/2010 | Stoick | B23P 19/025 |
| | | | | | 29/281.1 |
| 7,836,570 | B2 | * | 11/2010 | Swenson | B05B 13/0228 |
| | | | | | 29/281.6 |
| 8,387,235 | B2 | * | 3/2013 | Pervaiz | H02K 15/16 |
| | | | | | 29/762 |
| 8,590,151 | B2 | * | 11/2013 | Brown | F01D 25/285 |
| | | | | | 29/559 |
| 11,148,527 | B2 | * | 10/2021 | Wolf | F16C 27/04 |
| 2003/0062663 | A1 | * | 4/2003 | Fox | B25H 1/0007 |
| | | | | | 269/17 |
| 2008/0293502 | A1 | * | 11/2008 | Oinuma | F16C 35/047 |
| | | | | | 464/170 |
| 2009/0253521 | A1 | * | 10/2009 | Arden | F16D 1/10 |
| | | | | | 464/32 |
| 2010/0244388 | A1 | * | 9/2010 | Nakagawa | F16C 33/7886 |
| | | | | | 277/559 |
| 2015/0285297 | A1 | * | 10/2015 | Khanfar | F16C 3/023 |
| | | | | | 228/114 |
| 2016/0108968 | A1 | * | 4/2016 | Koguchi | F16C 35/077 |
| | | | | | 384/536 |
| 2017/0203651 | A1 | * | 7/2017 | Meckenstock | B60K 17/24 |
| 2019/0170196 | A1 | | 6/2019 | Jaeger et al. | |
| 2019/0331171 | A1 | * | 10/2019 | Toppazzini | F16F 1/32 |
| 2024/0383276 | A1 | * | 11/2024 | Schaaf | B60B 27/0073 |

FOREIGN PATENT DOCUMENTS

| CA | 3038945 | A1 | * | 10/2019 | F16D 3/221 |
| CN | 203479519 | U | | 3/2014 | |
| CN | 109451747 | A | | 3/2019 | |
| CN | 216746764 | U | | 6/2022 | |
| CN | 118124370 | A | | 6/2024 | |
| CN | 107941524 | B | | 7/2024 | |
| EP | 3011816 | B1 | | 4/2016 | |
| JP | 2008190582 | A | | 8/2008 | |
| KR | 20150076584 | A | | 7/2015 | |

* cited by examiner

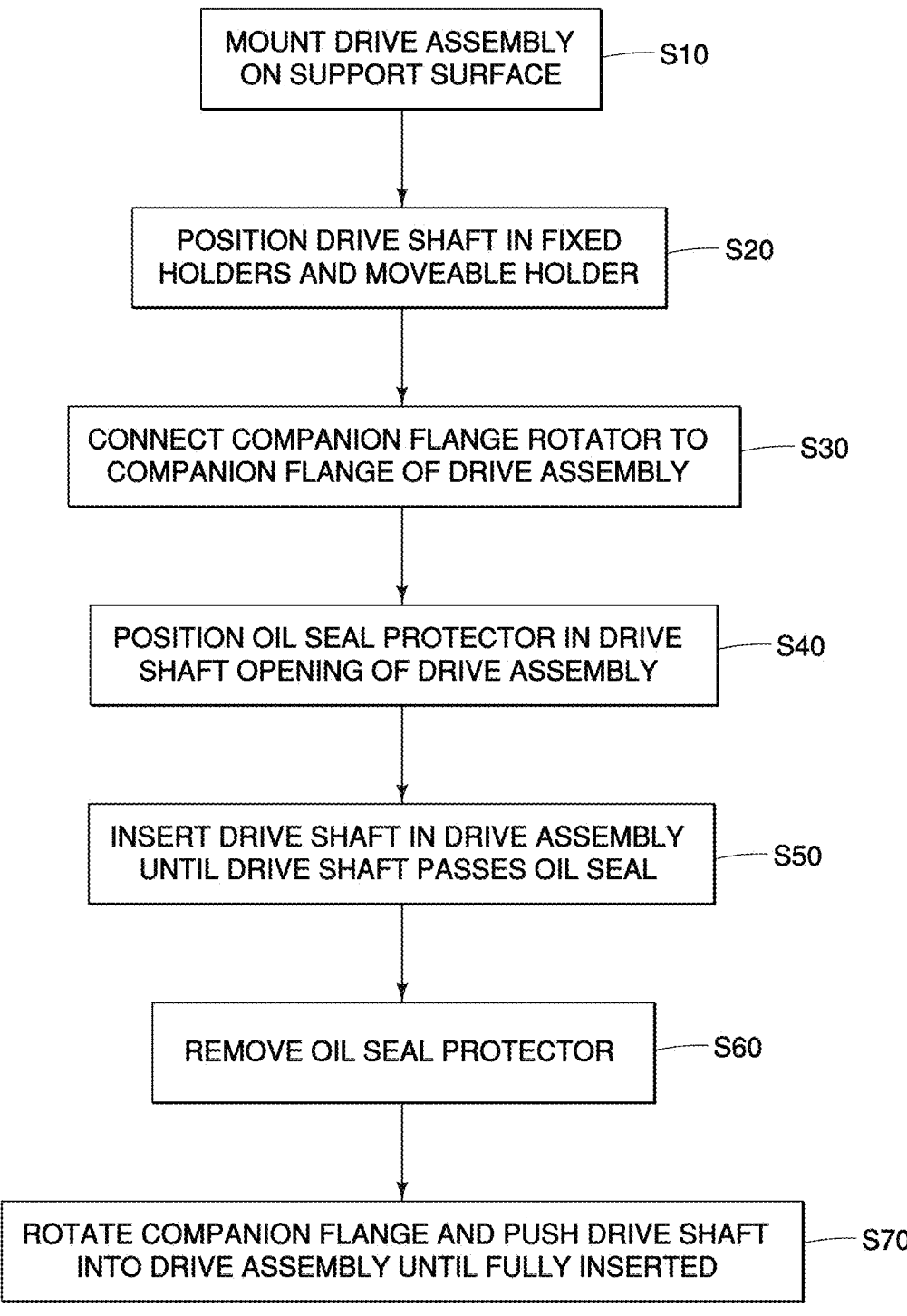

MOUNT DRIVE ASSEMBLY
ON SUPPORT SURFACE — S10

POSITION DRIVE SHAFT IN FIXED
HOLDERS AND MOVEABLE HOLDER — S20

CONNECT COMPANION FLANGE ROTATOR TO
COMPANION FLANGE OF DRIVE ASSEMBLY — S30

POSITION OIL SEAL PROTECTOR IN DRIVE
SHAFT OPENING OF DRIVE ASSEMBLY — S40

INSERT DRIVE SHAFT IN DRIVE ASSEMBLY
UNTIL DRIVE SHAFT PASSES OIL SEAL — S50

REMOVE OIL SEAL PROTECTOR — S60

ROTATE COMPANION FLANGE AND PUSH DRIVE SHAFT
INTO DRIVE ASSEMBLY UNTIL FULLY INSERTED — S70

FIG. 15

VEHICLE DRIVE SHAFT INSTALLATION ASSEMBLY AND METHOD

BACKGROUND

Technical Field

The present disclosure generally relates to a vehicle drive shaft installation assembly and method. More specifically, the present disclosure relates to a vehicle drive shaft installation assembly and method in which first and second fixed holders and a movable holder facilitate installation of a vehicle drive shaft.

Background Information

To insert a drive shaft into a final drive assembly, the splines of the drive shaft are aligned with the splines of a side gear of the final drive assembly. Positioning the vehicle drive shaft such that the splines and the rotational axes are properly aligned can be difficult and time consuming as multiple attempts are frequently required to obtain the proper alignments. Additionally, the rotation axes of the drive shaft and the side gear are aligned to allow for insertion of the drive shaft in the final drive assembly. Improper alignment between the splines of the final drive assembly and the drive shaft and/or an overly large insertion force applied to the drive shaft during installation can damage components of the drive shaft and the final drive assembly. Improper usage of an oil seal protector or not using an oil seal protector during insertion of the drive shaft in the final drive assembly can damage the oil seal through contact with splines of the drive shaft.

SUMMARY

A need exists for an improved vehicle drive shaft installation assembly and method.

In view of the state of the known technology, one aspect of the present disclosure is to provide a vehicle drive shaft installation assembly including a first fixed holder, a second fixed holder, and a movable holder. The first fixed holder is configured to support a vehicle drive shaft. The movable holder is configured to support the vehicle drive shaft. The movable holder is movable in an axial direction of the vehicle drive shaft. The second fixed holder is configured to support the vehicle drive shaft. The second fixed holder is disposed between the first fixed holder and the movable holder in the axial direction of the vehicle drive shaft. The vehicle drive shaft is configured to move axially relative to the first fixed holder and the second fixed holder.

Another aspect of the present disclosure is to provide a method of installing a vehicle drive shaft. A vehicle drive shaft is supported with a first fixed holder. The vehicle drive shaft is supported with a second fixed holder. The vehicle drive shaft is supported with a movable holder. The movable holder is movable to insert the vehicle drive shaft in a drive assembly.

Also other objects, features, aspects and advantages of the disclosed vehicle drive shaft installation assembly and method will become apparent to those skilled in the art from the following detailed description, which, taken in conjunction with the annexed drawings, discloses exemplary embodiments of the vehicle drive shaft installation assembly and method.

BRIEF DESCRIPTION OF THE DRAWINGS

Referring now to the attached drawings which form a part of this original disclosure:

FIG. 15 is a flowchart illustrating a method of installing a vehicle drive shaft.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
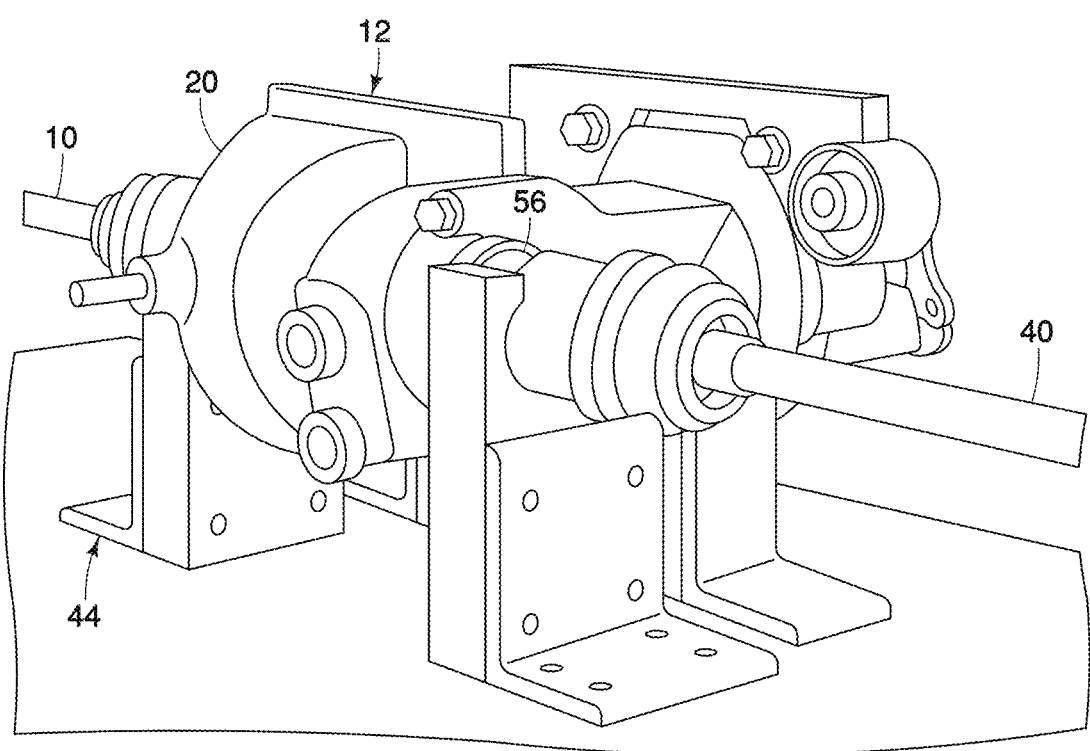
FIG. 1 is a perspective view of a vehicle drive shaft installation system.

Referring initially to FIG. 1, a vehicle drive shaft installation assembly and method is illustrated in accordance with a first embodiment. The vehicle drive shaft installation assembly and method facilitates installation of a vehicle drive shaft 10 in a final drive assembly 12.

Figure 2:
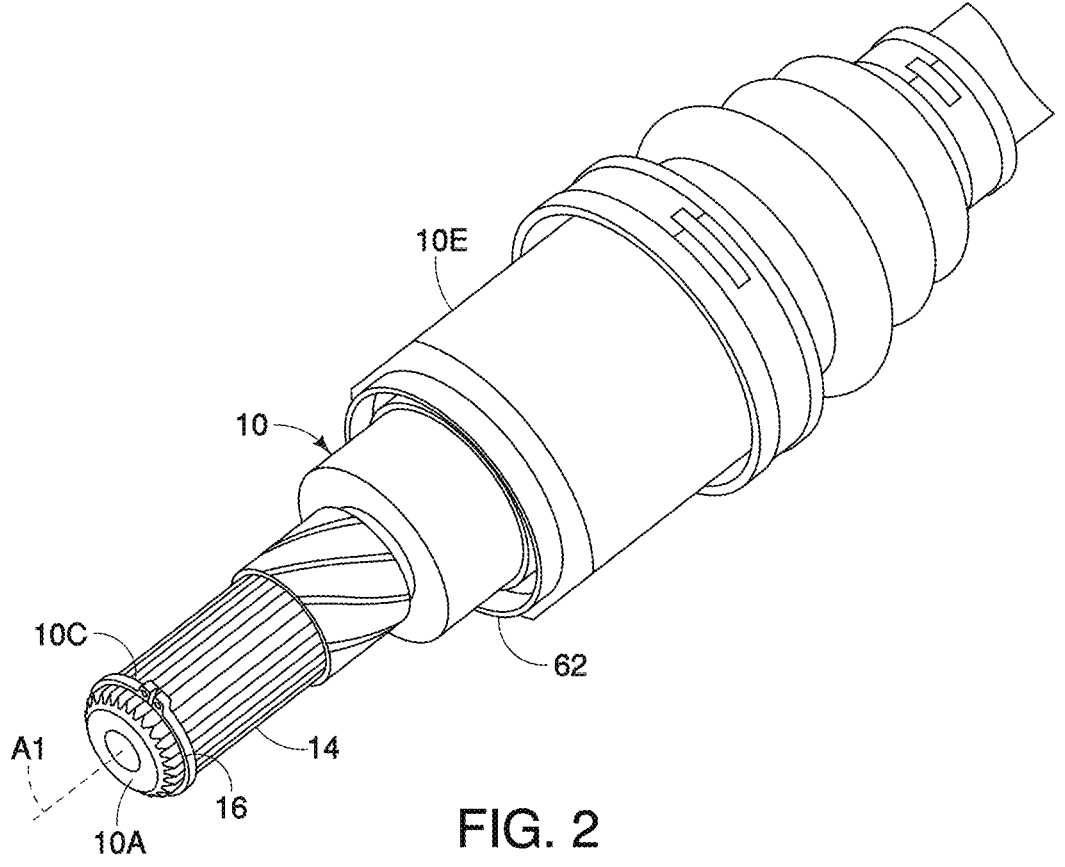
FIG. 2 is a perspective view of a vehicle drive shaft of FIG. 1.
Figure 8:
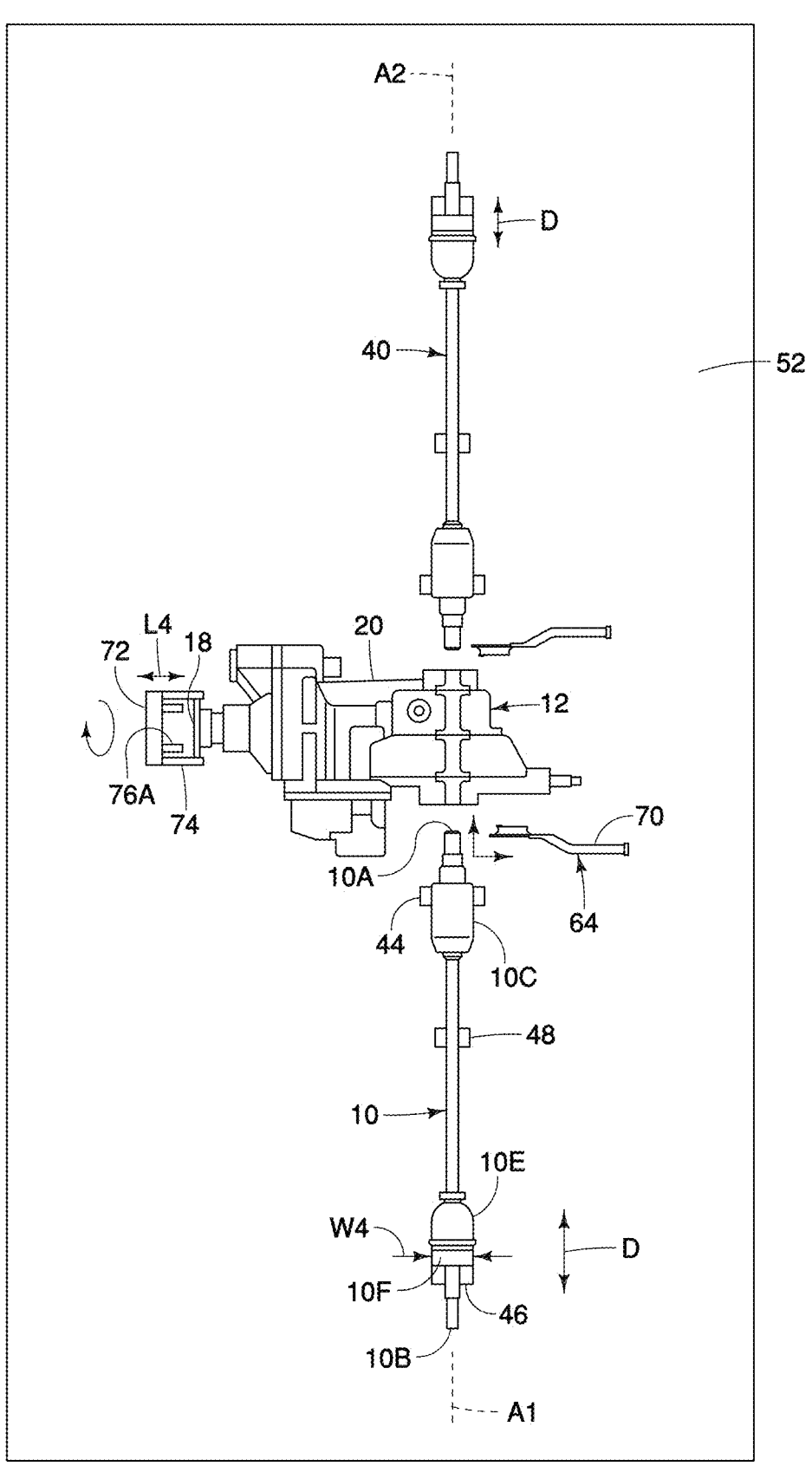
FIG. 8 is a top plan view of the vehicle drive shaft installation system of FIG. 1.

The vehicle drive shaft 10 is configured to transfer rotational force from the final drive assembly 12 to the drive wheels of the vehicle. The drive shaft 10 extends axially between a first end 10A and a second end 10B, as shown in FIG. 8. A plurality of splines 14 are disposed on an outer surface of the drive shaft 10, as shown in FIG. 2. The splines 14 extend axially from the first end 10A toward the second end 10B. A groove 10C is formed in the splines 14. A circlip 16 is received by the groove 10C to facilitate securing the drive shaft 10 to the final drive assembly 12 after insertion of the vehicle drive shaft 10 in the final drive assembly 12.

Figures 3, 4:
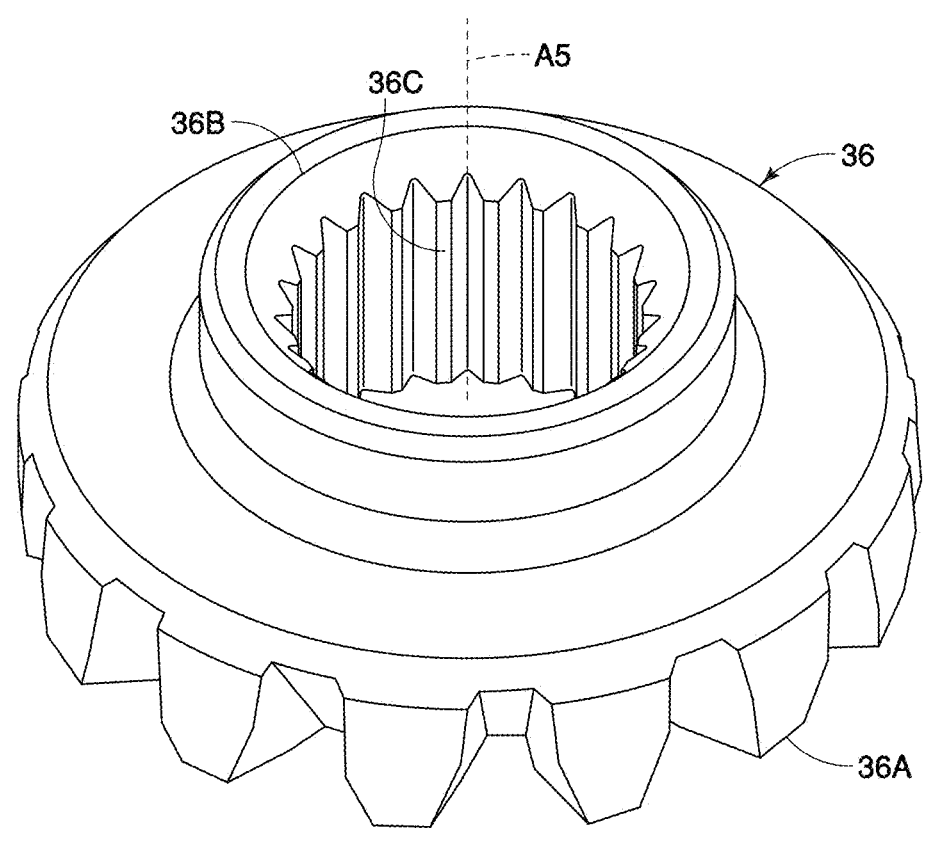
FIG. 3 is a perspective view of a side gear of a final drive assembly of FIG. 1.
FIG. 4 is a perspective view of the final drive assembly of FIG. 1.
Figure 5:
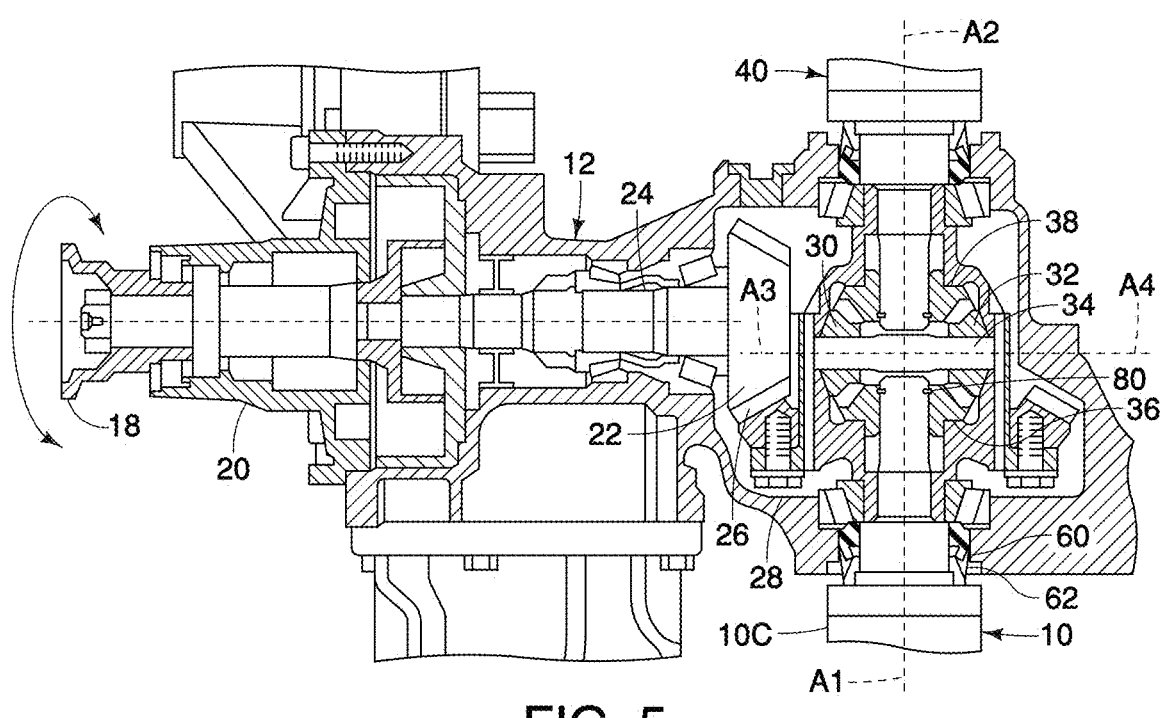
FIG. 5 is a top plan view in cross section of the final drive assembly of FIG. 1 receiving the vehicle drive shaft.

The final drive assembly 12 is a conventional final drive assembly and includes a companion flange 18, as shown in FIG. 4. The companion flange 18 is configured to receive a power transmission shaft that transmits power from a power source, such as an engine. The companion flange 18 is rotatably connected to a casing 20 of the final drive assembly 12, as shown in FIG. 5. The companion flange 18 is connected to a drive pinion 22 through an input shaft 24 such that rotation of the companion flange 18 rotates the drive pinion 22. A ring gear 26 is fixed to a differential case 28 and engages the drive pinion 22 such that rotation of the drive pinion 22 rotates the ring gear 26 that, in turn, rotates the differential case 28. First and second pinion gears 30 and 32 are rotatably supported by a pinion shaft 34 that is fixed to the differential case 28 such that rotation of the differential case 28 rotates the pinion shaft 34 and, in turn, rotates the first and second pinion gears 30 and 32.

First and second side gears 36 and 38 are rotatably disposed in the differential case 28, as shown in FIG. 5. Each of the first and second side gears 36 and 38 meshingly engage the first and second pinion gears 30 and 32. The rotation of the pinion shaft 15 rotates the first and second pinion gears 30 and 32, which, in turn, rotate first and second side gears 36 and 38. The rotation of the first and second gears 36 and 38 rotate the drive shafts 10 and 40, respectively. The first and second pinion gears 30 and 32 rotate with the differential case 28 about respective center, or rotational axes, A1 and A2 of the drive shafts 10 and 40. The first and second pinion gears 30 and 32 also rotate about rotation axes A3 and A4 of the first and second pinion gears 30 and 32, which is perpendicular to the rotation axes A1 and A2 of the drive shafts 10 and 40. The rotation axes A1 and A2 of the drive shafts 10 and 40 are substantially collinear. The rotation axes A3 and A4 of the first and second pinion gears 30 and 32 are substantially collinear. The rotation axes A3 and A4 are preferably substantially perpendicular to the rotation axes A1 and A2. This conventional configuration of the first and second pinion gears 30 and 32 allows for differential rotation of the drive shafts 10 and 40.

Rotation of the companion flange 18 rotates the first and second side gears 36 and 38. Rotation of the companion flange 18 is transmitted through the input shaft 24, the drive pinion 22, the ring gear 26, the differential case 28, the pinion shaft 34, the first and second pinion gears 30 and 32 to the first and second side gears 36 and 38. Rotation of the first and second side gears 36 and 38 rotates the first and second drive shafts 10 and 40, respectively.

Figure 9:
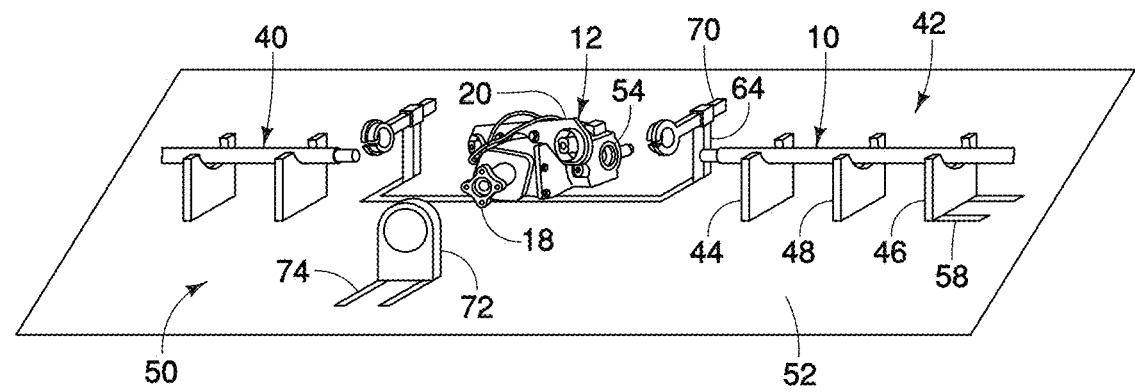
FIG. 9 is a perspective view of the vehicle drive shaft installation system of FIG. 1.

A vehicle drive shaft installation assembly 42 includes a first fixed holder 44, a movable holder 46 and a second fixed holder 48, as shown in FIGS. 8 and 9. The first fixed holder 44 is configured to support the vehicle drive shaft 10. The movable holder 46 is configured to support the vehicle drive shaft 10 and is configured to be movable in an axial direction D of the vehicle drive shaft 10. The second fixed holder 48 is configured to support the vehicle drive shaft 10. The second fixed holder 48 is disposed between the first fixed holder 44 and the movable holder in the axial direction of the vehicle drive shaft 10. The vehicle drive shaft 10 is configured to move axially relative to the first fixed holder 44 and the second fixed holder 48 during installation of the drive shaft 10 in the final drive assembly 12.

A second vehicle drive shaft installation assembly 50 is substantially similar to the vehicle drive shaft assembly 42, as shown in FIG. 9. The second vehicle drive shaft installation assembly 50 is configured to install the second vehicle drive shaft 40 to the final drive assembly 12. The following description regarding the vehicle drive shaft installation assembly 42 is equally applicable to the second vehicle drive shaft installation assembly 50.

The vehicle drive shaft installation assembly 42 is mounted on a support surface 52, such as a table, as shown in FIGS. 8 and 9. The final drive assembly 12 is mounted on the support surface 52 such that the first and second vehicle drive shaft installation assemblies 42 and 50 can be mounted on opposite sides of the final drive assembly 12. The first drive shaft 10 is inserted through a first opening, or a vehicle drive shaft opening, 54 in the final drive assembly case 12, as shown in FIGS. 4 and 9. The second drive shaft 40 is inserted through a second opening 56 (FIG. 1) on an opposite side of the final drive assembly casing 20 such that the rotational axes A1 and A2 of the drive shafts 10 and 40 are substantially collinear.

The first and second side gears 36 and 38 are rotatably disposed in the final drive assembly casing 20, as shown in FIG. 5. The first and second side gears 36 and 38 are preferably substantially identical. As shown in FIG. 3, the side gear 36 includes a plurality of teeth 36A disposed on an outer surface thereof. An opening 36B extends through the side gear 36 and defines an inner surface. A plurality of splines 36B are disposed on the inner surface of the side gear 36. The opening 36B is configured to receive the drive shaft 10 such that the splines 14 of the drive shaft 10 engage the splines 36B of the side gear 36 to facilitate transmitting rotation of the side gear 36 to the drive shaft 10. The opening 36B of the side gear 36 is aligned with the first opening 54 in the final drive assembly casing 20.

Figure 11:
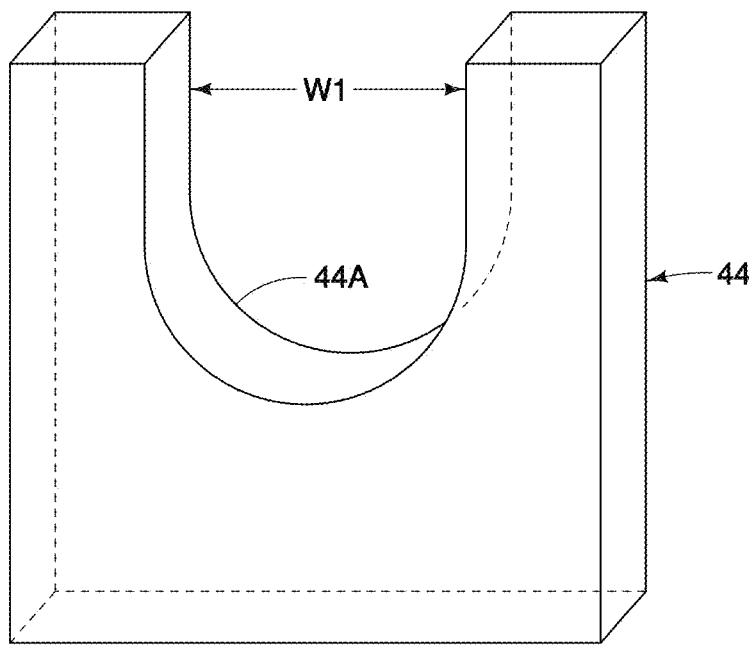
FIG. 11 is a perspective view of a first fixed holder of the vehicle drive shaft installation system of FIG. 1.

The first fixed holder 44 is rigidly connected to the support surface 52, as shown in FIGS. 8 and 9. In other words, the first fixed holder 44 is rigidly mounted to the support surface 52 such that the first fixed holder 44 does not move during axial movement of the first drive shaft 10 during installation to the final drive assembly 12. The first fixed holder 44 has a substantially rectangular shape when viewed in a direction parallel to the rotational axis of the drive shaft 10, as shown in FIG. 11. A substantially U-shaped recess 44A is formed in the first fixed holder 44 to facilitate receiving the first drive shaft 10. The substantially U-shaped recess 44A has a first width W1. The substantially U-shaped recess 44A of the first fixed holder 44 is configured to receive a first joint 10C, such as a ball joint, of the vehicle drive shaft 10.

The second fixed holder 48 is rigidly connected to the support surface 52, as shown in FIGS. 8 and 9. In other words, the second fixed holder 48 is rigidly mounted to the support surface 52 such that the second fixed holder 48 does not move during axial movement of the first drive shaft 10 during installation to the final drive assembly 12. The second fixed holder 48 has a substantially rectangular shape when viewed in a direction parallel to the rotational axis of the drive shaft 10. A substantially U-shaped recess 48A is formed in the first fixed holder 44 to facilitate receiving the first drive shaft 10. The substantially U-shaped recess 48A has a second width W2. The second width W2 is preferably smaller than the first width W1. The substantially U-shaped recess 48A of the second fixed holder 48 is configured to receive a shaft 10D of the vehicle drive shaft 10. The width W2 of the substantially U-shaped recess 48A is less than the width of the substantially U-shaped recess 44A of the first fixed holder 44 to facilitate accommodating the shaft 44D of the vehicle drive shaft 10.

Figure 13:
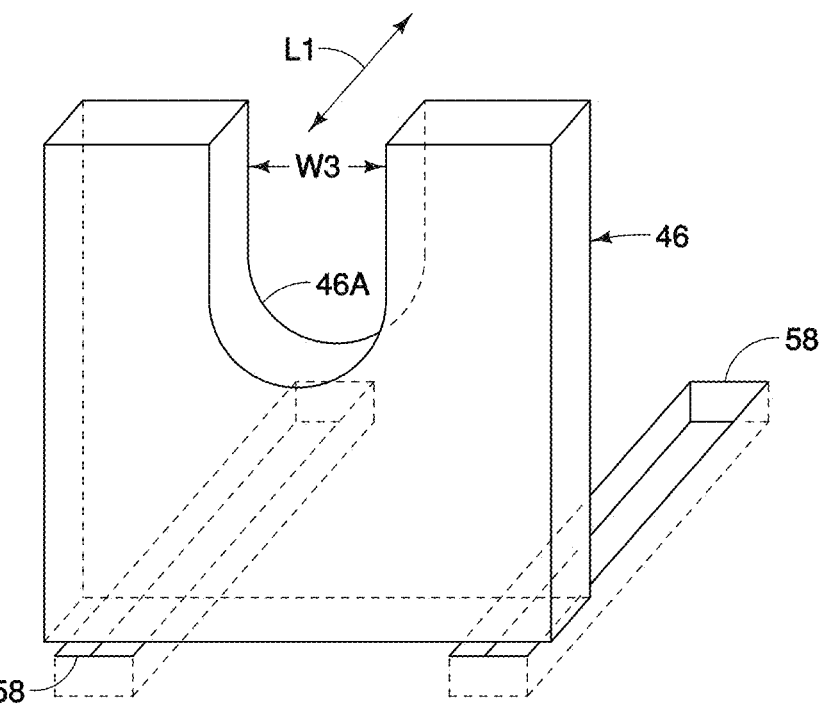
FIG. 13 is a perspective view of a movable holder of the vehicle drive shaft installation system of FIG. 1.

The movable holder 46 is movably connected to the support surface 52, as shown in FIGS. 8 and 9. The movable holder 46 is movable in a direction L1 along a track 58, as shown in FIG. 13. The direction L1 is substantially parallel to the axial direction D in which the drive shaft 10 is inserted in the final drive assembly 12. The track 58 can be formed in the support surface 52 or in a base that is rigidly mounted to the support surface 52. As shown in FIG. 13, the movable holder 46 moves along two tracks 58, although any suitable number of tracks 58 can be used, such as one track 58 or more than two tracks 58. The tracks 58 extend in the axial direction D. A substantially U-shaped recess 46A is formed in the movable holder 46 to facilitate receiving a second joint 10E, such as a tripod joint, of the first drive shaft 10. A third width W3 of the substantially U-shaped recess 46A is less than a fourth width W4 of a casing 10F of the second joint 10E, such that axial movement of the movable holder 46 along the tracks 58 toward the final drive assembly 12 axially moves the first drive shaft 10. In other words, movement of the movable holder 46 is configured to move the vehicle drive shaft 10. The movable holder 46 is movable along the tracks 58 between a first position in which the drive shaft 10 is disposed externally of the final drive assembly, as shown in FIG. 9, and a second position in which the drive shaft 10 is fully inserted in the final drive assembly 12, as shown in FIG. 5.

Figure 6:
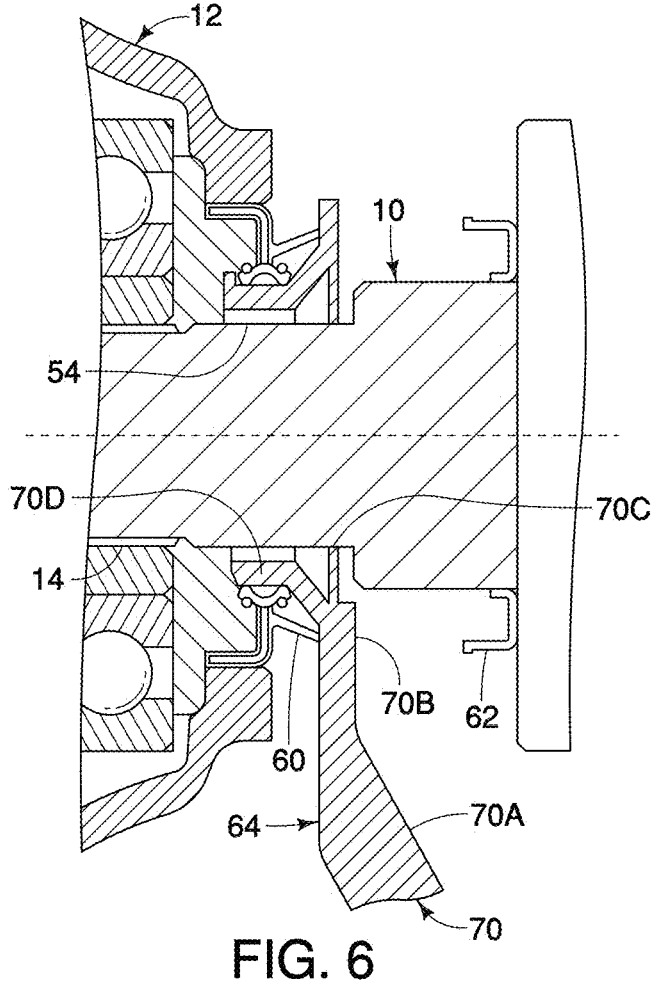
FIG. 6 is an elevational view in cross section of an oil seal of the final drive assembly of FIG. 1.

An oil seal 60 is disposed in the final drive assembly casing 20 of the final drive assembly 12, as shown in FIGS. 5 and 6, to prevent oil leakage. The oil seal 60 is disposed at the opening 54 in the final drive assembly case 20. The drive shaft 10 passes through the oil seal 60 during insertion of the drive shaft 10 in the final drive assembly 12. The first joint 10C of the drive shaft 10 includes a dust cover 62, as shown in FIGS. 2 and 5. The dust cover 62 protects the oil seal 60 after installation of the drive shaft 10, as shown in FIG. 5, by preventing exposure of the oil seal 60.

Figure 7:
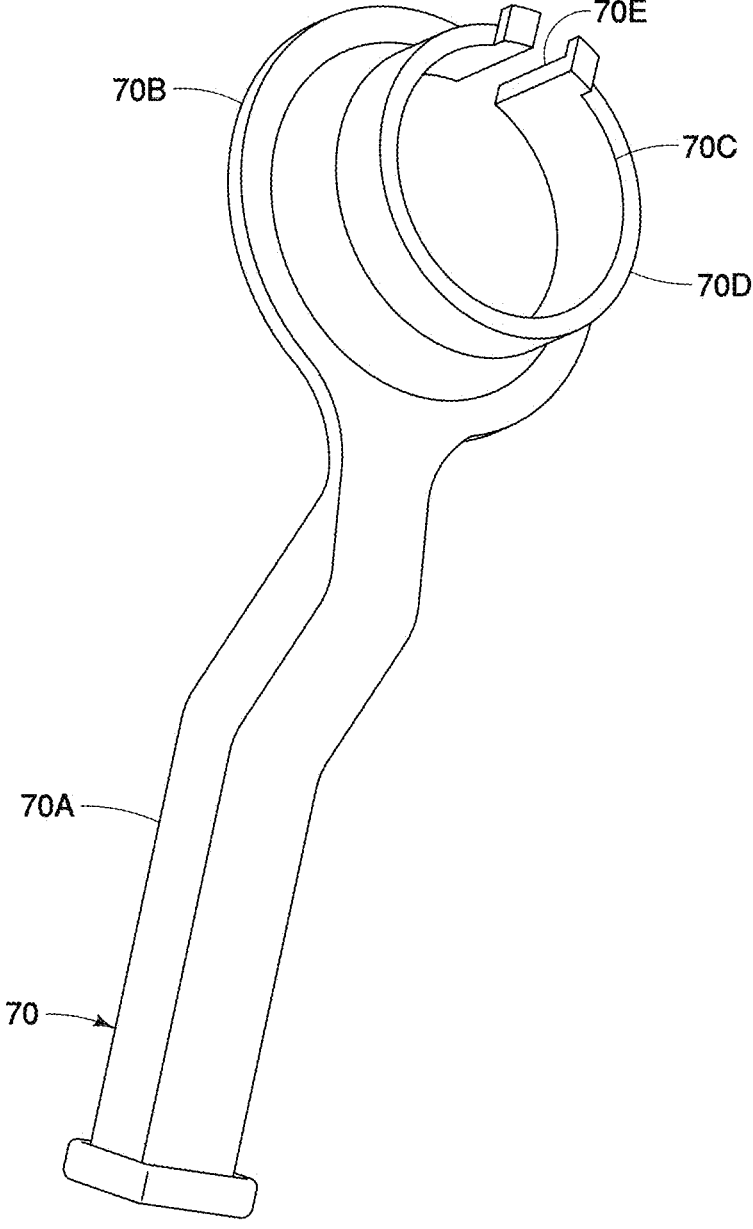
FIG. 7 is a perspective view of an oil seal protector.
Figure 14:
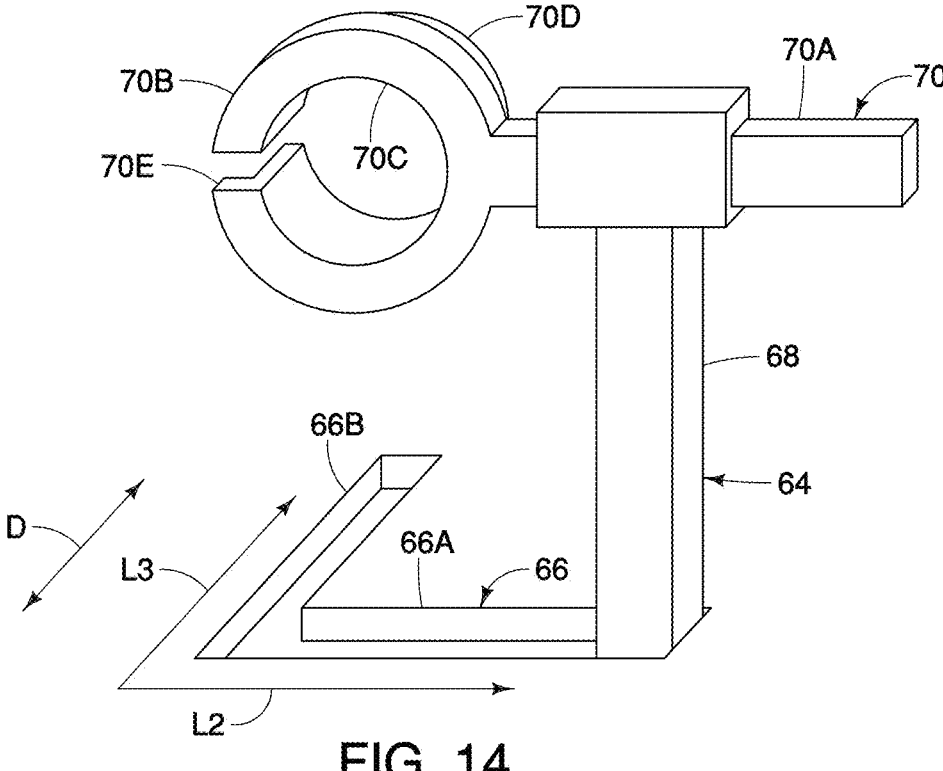
FIG. 14 is a perspective view of an oil seal protector holder of the vehicle drive shaft installation system of FIG. 1.

The vehicle drive shaft installation assembly 42 further includes a movable protector 64, as shown in FIGS. 6-8. The movable protector 64 is configured to be movable relative to the final drive assembly 12 along a track 66, as shown in FIGS. 9 and 14, to protect the oil seal 60 of the final drive assembly 12 during insertion of the drive shaft 12 into the final drive assembly 12. The track 66 can be formed in the support surface 52 or in a base that is rigidly mounted to the support surface 52.

The track 66 along which the movable protector 64 is movable includes a first track segment 66A and a second track segment 66B. The first track segment 66A provides movement of the movable protector 64 in a second direction L2. The second track segment 66B provides movement of the movable protector 64 in a third direction L3. The first track segment 66A is substantially perpendicular to the second track segment 66B. The first track segment 66A is preferably substantially perpendicular to the axial direction D. The second track segment 66B is preferably substantially parallel to the axial direction D. In other words, the movable protector 64 is configured to move in a first direction along the first track segment 66A and a second direction along the second track segment 66B in which the first direction is different from the second direction. The first direction is along the first track segment 66A, which is substantially perpendicular to the axial direction of the vehicle drive shaft 10. The second direction is along the second track segment 66B, which is substantially parallel to the axial direction of the vehicle drive shaft 10.

The movable protector 64 includes a support 68 that is movable along the track 66, as shown in FIG. 14. The movable protector 64 is configured to receive and support a protector 70. The protector 70 includes an arm 70A that is received by the support 68 of the movable protector 64. A substantially annular member 70B is connected to an end of the arm 70A. The substantially annular member 70B has an opening 70C extending therethrough. The opening 70C is configured to receive the drive shaft 10 during insertion of the drive shaft 10 into the final drive assembly 12, as shown in FIG. 6. An extension member 70D extends outwardly from the annular member 70B. The extension member 70D is configured to be received in the opening 54 in the final drive assembly 12 to protect the oil seal 60 during insertion of the vehicle drive shaft 10. In other words, the movable protector 64 is configured to be received by the vehicle drive shaft opening 54 of the final drive assembly 12 during insertion of the vehicle drive shaft 10 in the final drive assembly 12. A gap 70E is formed in the annular member 70B, as shown in FIGS. 7 and 14. The substantially annular member 70B is preferably made of a flexible material, such as rubber, to facilitate flexing of the substantially annular member 70B. The movable protector 64 is movable along the tracks 66 between a first position in which the extension member 70D of the movable protector 64 is spaced from the opening 54 in the final drive assembly 12, as shown in FIGS. 8 and 9, and a second position in which the extension member 70D of the movable protector 64 is received by the opening 54 in the final drive assembly 12, as shown in FIG. 6.

Figure 10:
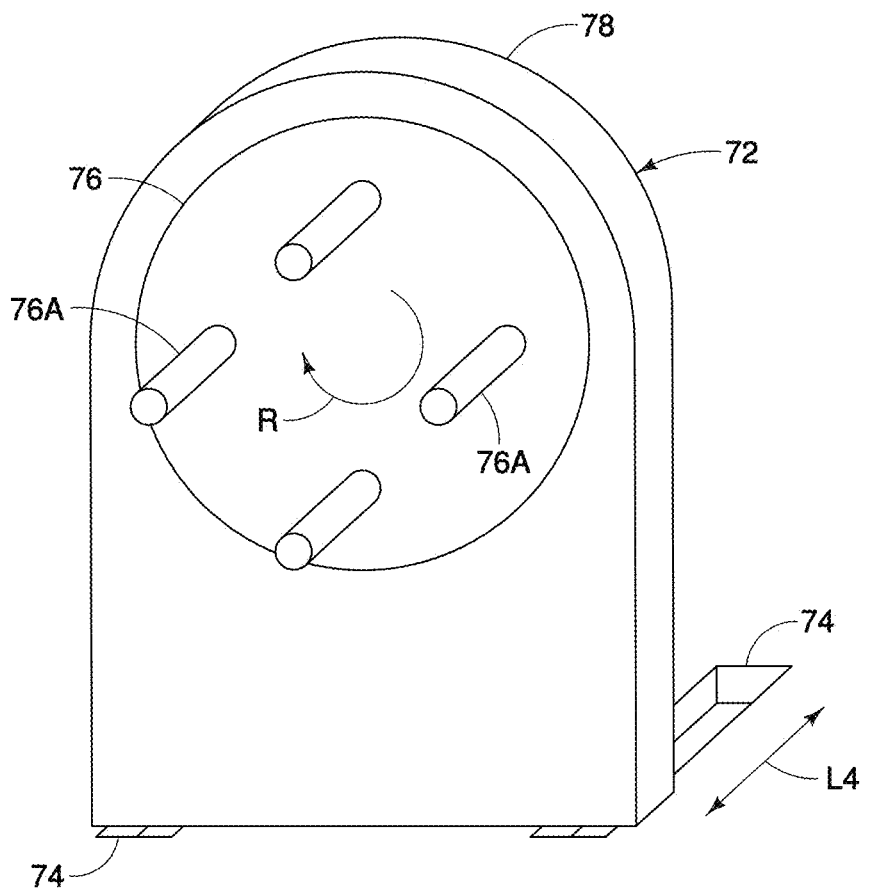
FIG. 10 is a perspective view of a companion flange rotator of the vehicle drive shaft installation system of FIG. 1.

The vehicle drive shaft installation assembly 42 further includes a companion flange rotator 72, as shown in FIGS. 8-10. The flange rotator 72 is movably connected to the support surface 52, as shown in FIGS. 8 and 9. The flange rotator 72 is movable in a direction L4 along a track 74, as shown in FIG. 10. The direction L4 is substantially perpendicular to the axial direction D in which the drive shaft 10 is inserted in the final drive assembly 12. The track 74 can be formed in the support surface 52 or in a base that is rigidly mounted to the support surface 52. As shown in FIG. 13, the flange rotator 72 moves along two tracks 74, although any suitable number of tracks 74 can be used, such as one track 74 or more than two tracks 74. The tracks 74 extend in the direction L4. The flange rotator 74 is movable along the tracks 74 from a first position in which the flange rotator 74 is spaced from the companion flange 18 and a second position in which the flange rotator 74 engages the companion flange 18.

The companion flange rotator 72 includes a movable member 76 that is movably connected to a base 78 of the flange rotator 72, as shown in FIG. 10. The movable member 76 is movable relative to the base 78 of the flange rotator 72. A plurality of pins 76A outwardly from the movable member 76. The pins 76A are configured to be received by openings 18A (FIG. 4) in the companion flange 18. When the pins 76A of the flange rotator 72 are received by the openings 18A in the companion flange 18, rotation of the movable member 76 in rotational direction RI causes rotation of the companion flange 18. In other words, rotation of the movable member 76 of the companion flange rotator 72 causes rotation of the first and second side gears 36 and 38.

As shown in FIG. 9, the second vehicle drive shaft installation assembly 50 is substantially identical to the vehicle drive shaft installation assembly 42, except that a second companion flange rotator is not required as the final drive assembly 12 only has one companion flange 18 that rotates the first and second side gears 36 and 38.

A flowchart illustrating installation of the drive shaft 10 in the final drive assembly 12 is shown in FIG. 15. In a first step S10 of FIG. 15, the final drive assembly 12 is mounted on the support surface 52, as shown in FIGS. 8 and 9. The final drive assembly 12 is rigidly mounted to the support surface 52 to substantially prevent movement of the final drive assembly relative to the support surface 52 during insertion of the vehicle drive shaft 10 in the final drive assembly 12.

Figure 12:
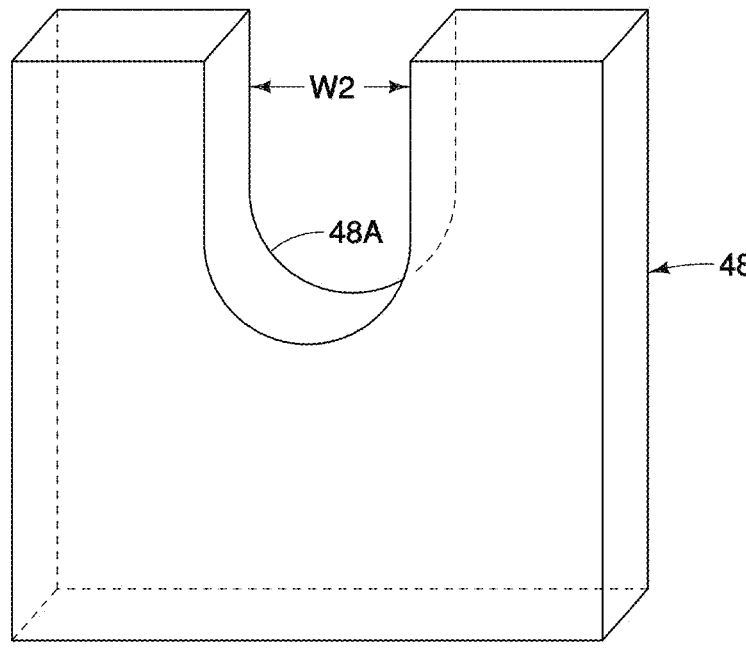
FIG. 12 is a perspective view of a second fixed holder of the vehicle drive shaft installation system of FIG. 1.

In step S20 of FIG. 15, the vehicle drive shaft 10 is then positioned in the first fixed holder 44, the second fixed holder 48, and the movable holder 46, as shown in FIGS. 8 and 9. The first joint 10C of the vehicle drive shaft 10 is received in the recess 44A (FIG. 11) of the first fixed holder 44. The shaft 10D of the vehicle drive shaft 10 is received by the recess 48A (FIG. 12) of the second fixed holder 48. The second joint 10E of the vehicle drive shaft 10 is received by the recess 46E (FIG. 13) of the movable holder 13. The first end 10A of the vehicle drive shaft 10 is spaced from the opening 54 in the final drive assembly case 20. The vehicle drive shaft 10 is supported by the first fixed holder 44, the second fixed holder 48 and the movable holder 46. The first fixed holder 44, the second fixed holder 48 and the movable holder 46 are mounted to the support surface 52 such the center axis A1 of the vehicle drive shaft 10 is aligned with the center axis A5 of the side gear 36.

In step S30 of FIG. 15, the companion flange rotator 72 is connected to the companion flange 18 of the final drive assembly 12, as shown in FIGS. 8 and 9. The companion flange rotator 72 is moved along the tracks 74 in the direction L4 until the pins 76A of the movable member 76 of the companion flange rotator 72 engage the openings 18A in the companion flange 18.

In step S40 of FIG. 15, the movable protector 64 is moved to position the extension member 70D of the substantially annular member 70B in the drive shaft opening 54 of the final drive assembly 12, as shown in FIGS. 6, 8 and 9. The movable protector 64 is moved between the final drive assembly 12 and the vehicle drive shaft 10 prior to moving the movable holder 46 to insert the vehicle drive shaft 10 in the final drive assembly 12. After the movable protector 64 is in place to protect the oil seal 60, the installation process moves to the next step.

In step S50 of FIG. 15, the movable holder 46 is moved to insert the drive shaft 10 in the drive shaft opening 54 in the final drive assembly 12. The movable holder 46 moves along the tracks 58 in the direction L1 to move the drive shaft 12 in the axial direction D. The third width W3 of the recess 46E in the movable holder 46 is less than the fourth width W4 of the casing 10F of the second joint 10E such that axial movement of the movable holder 46 moves the drive shaft 10 in the axial direction D. In other words, axial movement of the movable holder 46 moves the vehicle drive shaft 10. Preferably, the companion flange 18 is rotated to rotate the side gear 36 and the drive shaft 10 is rotated during the insertion process. The companion flange 18 and the drive shaft 10 are preferably rotated at different rotational speeds.

The movable holder 46 moves the drive shaft 10 until the splines 14 of the vehicle drive shaft 10 pass the oil seal 60, as shown in FIG. 6. The first fixed holder 44 and the second fixed holder 48 are rigidly mounted to the support surface 52 such that the first fixed holder 44 and the second fixed holder 48 do not move while moving the movable holder 46 to insert the vehicle drive shaft 10.

A first movement step of the movable holder 46 includes moving the movable holder 46 until the vehicle drive shaft 10 passes the oil seal 60 of the drive assembly, as shown in FIG. 6. The drive shaft 10 is moved until the splines 14 of the drive shaft 10 have completely passed the oil seal 60 in the insertion direction D of the drive shaft 10.

In step S60, the movable protector 64 is removed, as shown in FIGS. 6, 8 and 14. The movable protector 64 is first moved along the second track segment 66B to remove the extension member 70D from the opening 54 in the final drive assembly case 20. The movable protector 64 is then moved along the first track segment 66A to remove the substantially annular member 70B from the drive shaft 10. The gap 70E in the substantially annular member 70B facilitates flexing of the substantially annular member 70B as the movable protector is moved along the first track segment 66A away from the drive shaft 10 and allows the substantially annular member 70B to be disengaged from the drive shaft 10. The movable protector 64 is removed after the first movement step of the movable holder 46.

In step S70 of FIG. 15, the companion flange rotator 72 is rotated to facilitate aligning the splines 36C of the side gear 36 with the splines 14 of the vehicle drive shaft 10. As shown in FIGS. 5 and 6, when the splines 14 of the vehicle drive shaft 10 have passed the oil seal 60, the splines 14 of the vehicle drive shaft 10 have not yet engaged the splines 36C of the side gear 36. The center axes A1 and A5 of the drive shaft 10 and the side gear 36 are aligned, such that the companion flange rotator 72 is rotated to align the splines 36C of the side gear 36 with the splines 14 of the vehicle drive shaft 10.

In step S70 of FIG. 15, once the splines 36C of the side gear 36 are aligned with the splines 14 of the vehicle drive shaft 10, the movable member 45 is further moved to insert the drive shaft 10 through the side gear 36. The drive shaft 10 is inserted with sufficient force to compress the circlip 16 as the splines 14 of the drive shaft 10 enter the side gear 36. The drive shaft 10 is inserted until the circlip 16 engages a corresponding recess 80 in the side gear 36, as shown in FIG. 5. Alternatively, a sensor can be positioned at a predetermined position the track 58 of the movable holder 46 corresponding to the insertion position of the drive shaft 10. The sensor transmits a signal to a controller to stop rotational movement of the companion flange 18 and the drive shaft 10, and to stop axial movement of the movable holder 46.

The installation process includes moving the movable holder 46 in two movement steps. In the first movement step, in Step S50, the movable holder 46 is moved until the vehicle drive shaft 10 passes the oil seal 60 of the final drive assembly 12. In the second movement step, in step S70, the movable holder 46 is moved until the vehicle drive shaft 10 is fully inserted in the final drive assembly 12. The companion flange 18 is rotated between the first movement step and the second movement step of the movable holder 46 to align the respective splines 14 and 36C to facilitate inserting the drive shaft 10 in the side gear 36. In other words, the companion flange 18 is rotated after the first movement step and before the second movement step of the movable holder 46. The companion flange 18 is rotated after inserting the drive shaft 10 in the final drive assembly such that the splines 14 move past the oil seal 60, and prior to engaging the respective splines 10 and 36C. In other words, the companion flange 18 of the final drive assembly 12 is rotated prior to engaging the splines 14 of the vehicle drive shaft 10 with the splines 36C of the side gear 36 of the final drive assembly 12.

As shown in FIGS. 5 and 9, both drive shafts 10 and 40 can be inserted in the final drive assembly 12 at the same time.

Alternatively, steps S40-S70 can be performed automatically. An electronic controller can control movements of the movable holder 46, the movable protector 64, and the movable member 76 of the companion flange rotator 72. Steps S10-S30 are performed manually, and then the electronic controller controls the remaining installation steps.

The drive shaft installation assembly 42 and method facilitates axially aligning the center axes A1 and A5 of the drive shaft 10 and the side gear 36, and facilitates rotationally aligning the splines 14 of the drive shaft 10 with the splines 36C of the side gear 36, thereby providing an efficient installation process.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment (s), the following directional terms "forward", "rearward", "above", "downward", "vertical", "horizontal", "below" and "transverse" as well as any other similar directional terms refer to those directions of a vehicle equipped with the vehicle drive shaft installation assembly. Accordingly, these terms, as utilized to describe the present invention should be interpreted relative to a vehicle equipped with the vehicle drive shaft installation assembly.

The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A vehicle drive shaft installation assembly comprising:
a first fixed holder configured to support a vehicle drive shaft;
a movable holder configured to support the vehicle drive shaft, the movable holder being movable in an axial direction of the vehicle drive shaft; and
a second fixed holder configured to support the vehicle drive shaft, the second fixed holder being disposed between the first fixed holder and the movable holder in the axial direction of the vehicle drive shaft, an entirety of the vehicle drive shaft being configured to move axially relative to the first fixed holder and the second fixed holder.

2. The vehicle drive shaft installation assembly according to claim 1, wherein
movement of the movable holder is configured to move the vehicle drive shaft.

3. The vehicle drive shaft installation assembly according to claim 1, wherein
a movable protector is configured to be movable relative to a drive assembly to protect an oil seal of the drive assembly during insertion of the vehicle drive shaft into the drive assembly.

4. The vehicle drive shaft installation assembly according to claim 3, wherein
the movable protector is configured to move in a first direction and a second direction, the second direction being different than the first direction.

5. The vehicle drive shaft installation assembly according to claim 4, wherein
the first direction is substantially perpendicular to the axial direction of the vehicle drive shaft, and the second direction is substantially parallel to the axial direction of the vehicle drive shaft.

6. The vehicle drive shaft installation assembly according to claim 3, wherein
the movable protector is configured to be received by a vehicle drive shaft opening of the drive assembly during insertion of the vehicle drive shaft in the drive assembly.

7. The vehicle drive shaft installation assembly according to claim 1, wherein
the first fixed holder is configured to receive a first joint of the vehicle drive shaft.

8. The vehicle drive shaft installation assembly according to claim 1, wherein
the second fixed holder is configured to receive a shaft of the vehicle drive shaft.

9. The vehicle drive shaft installation assembly according to claim 1, wherein
the movable holder is configured to receive a second joint of the vehicle drive shaft.

10. The vehicle drive shaft installation assembly according to claim 1, wherein
the first fixed holder has a first recess configured to receive the vehicle drive shaft, and the second fixed holder has a second recess configured to receive the vehicle drive shaft, a width of the first recess being larger than the second recess.

11. A method of installing a vehicle drive shaft comprising:
supporting a vehicle drive shaft with a first fixed holder;
supporting the vehicle drive shaft with a second fixed holder;
supporting the vehicle drive shaft with a movable holder; and
moving the movable holder to insert the vehicle drive shaft in a drive assembly, axial movement of the movable holder axially moves an entirety of the vehicle drive shaft relative to the first fixed holder and the second fixed holder.

12. The method of installing a vehicle drive shaft of claim 11, further comprising
moving a movable protector between the drive assembly and the vehicle drive shaft prior to moving the movable holder to insert the vehicle drive shaft.

13. The method of installing a vehicle drive shaft of claim 11, wherein the first fixed holder and the second fixed holder are configured to not move while moving the movable holder to insert the vehicle drive shaft.

14. The method of installing a vehicle drive shaft of claim 12, further comprising rotating a companion flange of the drive assembly prior to engaging splines of the vehicle drive shaft with splines of a gear of the final drive assembly.

15. The method of installing a vehicle drive shaft of claim 14, wherein the moving the movable holder includes a first movement step and a second movement step.

16. The method of installing a vehicle drive shaft of claim 15, wherein the first movement step includes moving the movable holder until the vehicle drive shaft passes an oil seal of the drive assembly.

17. The method of installing a vehicle drive shaft of claim 16, wherein the second movement step includes moving the movable holder until the vehicle drive shaft is fully inserted in the drive assembly.

18. The method of installing a vehicle drive shaft of claim 17, further comprising removing the movable protector after the first movement step.

19. The method of installing a vehicle drive shaft of claim 18, wherein the companion flange is rotated after the first movement step and before the second movement step of the movable holder.

\* \* \* \* \*